Nov. 15, 1966 W. SCHULER 3,285,226
ANIMAL WATERING DEVICE
Filed Feb. 23, 1965 2 Sheets-Sheet 2
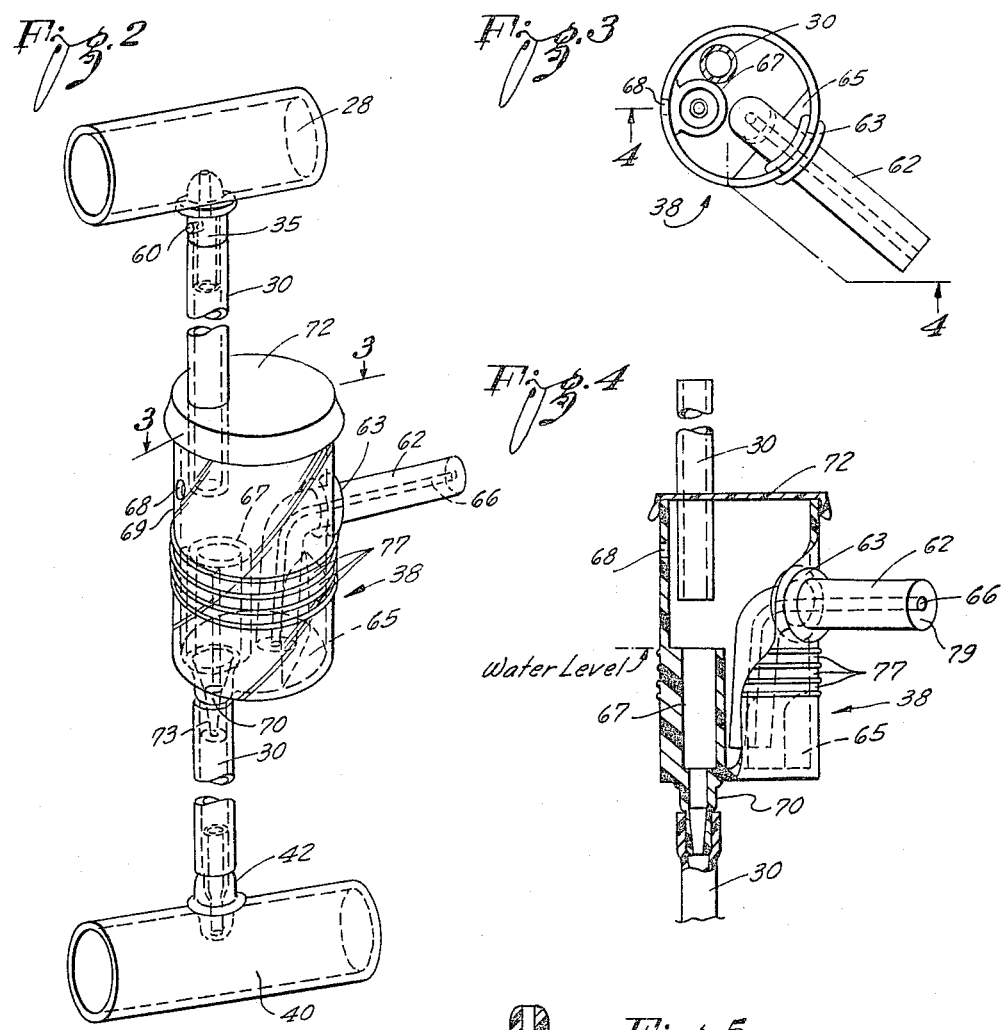
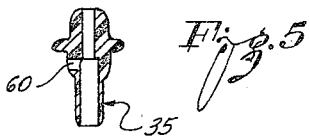
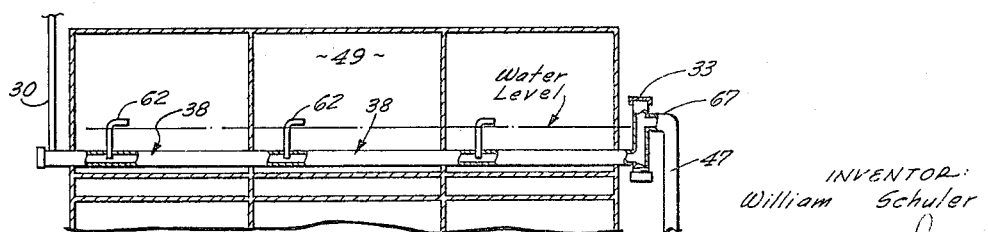
INVENTOR:
William Schuler

United States Patent Office 3,285,226
Patented Nov. 15, 1966

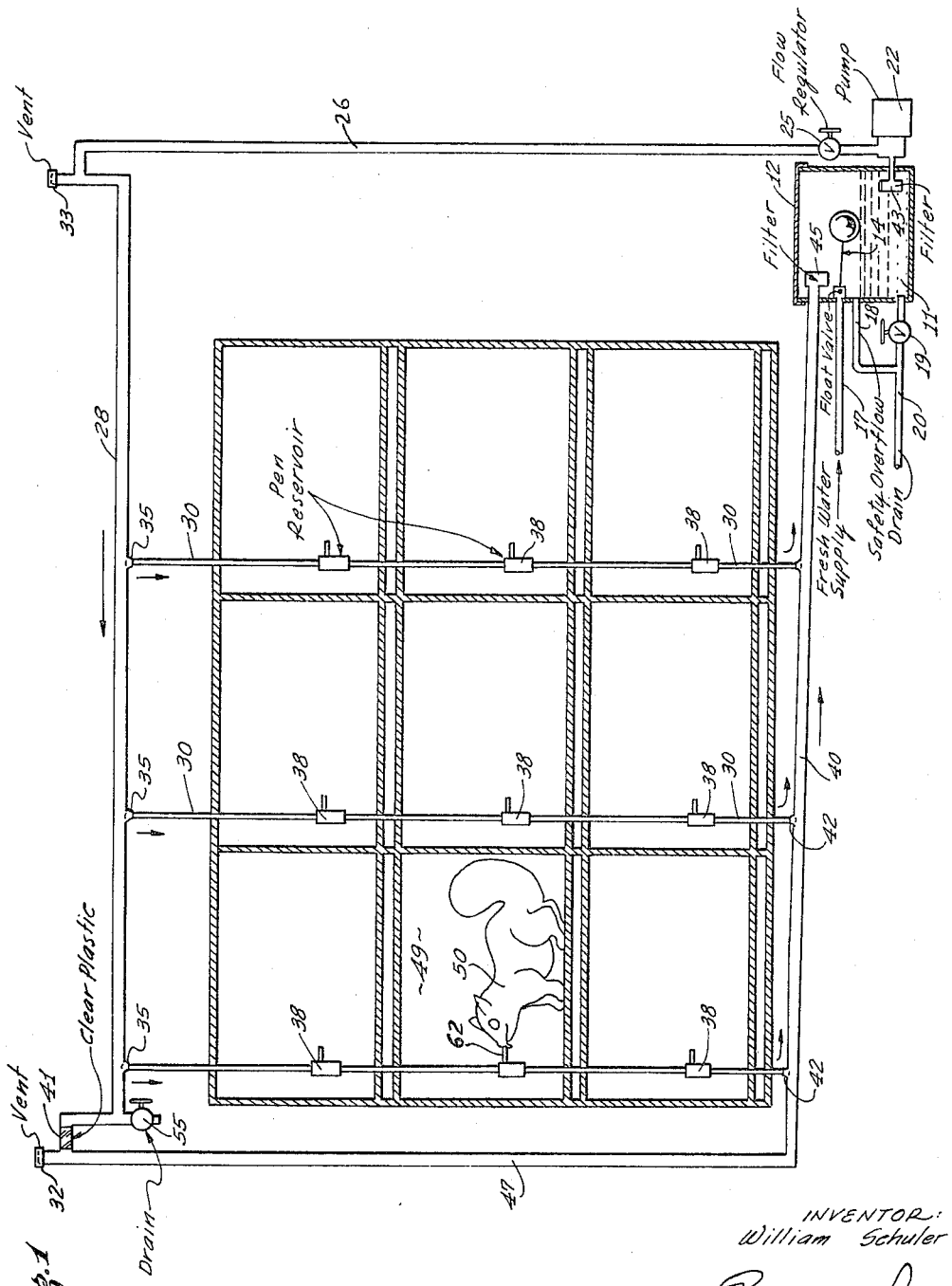

3,285,226
ANIMAL WATERING DEVICE
William Schuler, Rte. 1, Box 235, Twain Harte, Calif.
Filed Feb. 23, 1965, Ser. No. 434,539
14 Claims. (Cl. 119—18)

This invention relates to an animal watering device and more particularly to such a device suitable for supplying water to small animals which utilizes a closed continuously circulating water system and supplies water to the animals on demand.

In supplying water to a great number of animals, such as, for example, on a rabbit or chinchilla ranch, it is important that such water supply be kept free from contamination to prevent disease from spreading to the animals. Along these lines, the water system should be such that it cannot transmit disease from one animal to another. In watering a small animal, such as a chinchilla, the animal generally takes the water at a slow rate so that a feed system providing a gradual flow is highly desirable.

Animal watering systems of the prior art often utilize open systems where the water supply runs from animal to animal in a trough or on drip bars, or the like. These type of open systems obviously are quite subject to contamination and tend to spread disease from animal to animal. In the raising of valuable animals such as mink and chinchilla, which are rather subject to contagious infection, this type of open system has generally been abandoned. To overcome the problems of open type systems, various closed and individual feeding systems have been evolved.

One of these involves the use of an actuator button which when actuated by the animal releases water. This type of system, while it is closed and provides the desired demand feeding type operation, readily tends to become leaky if dirt should get into the valve mechanism; in addition, some leakage tends to occur each time the animal drinks with the resultant wetting of the animal pens. This not only wastes water but, more important, messes up the pens and provides unhealthy conditions for the animals. This type of feeding is also generally new to the animal and sometimes requires training for proper use.

Other animal feed systems utilize separate water bottles for each animal. This effectively assures that each animal has a fresh supply of water which cannot be contaminated by the other animals. However, such individual water bottles must be refilled regularly which involves a considerable amount of labor, especially in large ranch installations. Further, most water bottles tend to leak when the animals jump in the pens.

The device of this invention overcomes the shortcomings of prior art animal watering systems, providing a closed system which furnishes water on demand at a gradual rate to the animals. Such system does not respond to a button actuation by the animal and therefore is not subject to the inherent problems of the actuator system. Water is rather supplied in a natural manner similar to the fashion in the case of water bottle feed. Further, the system, while it supplies a continuous supply of fresh water, automatically circulates such water and there is no requirement for frequent manual operation such as for example the replacement of bottle units or the like. In the device of the invention, each animal has his own isolated feed reservoir where water is always available to him and yet with no dripping of such water into his pen.

These desired end results are achieved in the device of the invention by utilizing a unique reservoir unit in each animal pen through which water is constantly circulated by means of a closed water system. Water is circulated from a water supply tank through feed lines to the individual feed reservoir units and then returned to the tank for recirculation. Each feed reservoir unit includes a receptacle having a standpipe therein to establish a predetermined water level. Running from each receptacle is a feed tube having a small inside diameter which feeds water to the animal by capillary action. The feed tube is set with relation to the standpipe so that there always is water available at the end thereof facing the animal, which adheres to the end of such tube by virtue of surface tension. As the animal licks the end of the tube, removing the water therefrom, this water is immediately replaced by the capillary action. Thus the device of the invention provides a fresh supply of water to the animal on a gradual basis without any dripping of water.

It is therefore an object of this invention to provide an improved animal watering system.

It is a further object of this invention to provide an animal watering system for small animals which provides water on a gradual basis on demand of the animal.

It is still a further object of this invention to provide a closed circulating animal water feed system wherein the danger of contamination and infection of the animals is minimized.

It is still another object of this invention to provide an animal watering system which operates automatically and requires a minimum amount of maintenance.

It is still another object of this invention to provide a unique reservoir unit for use in an animal watering system.

Other objects of this invention will become apparent from the following description taken in connection with the accompanying drawings of which, FIG. 1 is a schematic diagram illustrating a preferred embodiment of the device of the invention, FIG. 2 is a perspective drawing illustrating the feed reservoir mechanism of the preferred mechanism of the preferred embodiment of the device of the invention, FIG. 3 is a cross-sectional view as taken along the plane indicated by the line 3—3 in FIG. 2, FIG. 4 is a cross-sectional view as taken along the plane indicated by the line 4—4 in FIG. 3, FIG. 5 is a cross-sectional view of a top connecting nipple which may be utilized in the device of the invention, and FIG. 6 is a schematic drawing illustrating a second embodiment of the device of the invention.

Referring now to FIG. 1, a schematic drawing of a preferred embodiment of the device of the invention is shown. The water supply 11 is maintained in tank 12 at a pre-determined level by means of ball float valve mechanism 14. Fresh water is supplied through pipe line 17 and drain valve 19 is provided to drain water off when desired through pipe line 20. Ball float valve mechanism 14 may be any conventional such device as for example those utilized in standard plumbing installations. Safety overflow-drain 18 is provided to prevent overflow should the float valve mechanism fail to function properly or if the system is turned off and water flows back into the tank. In this manner, a constant supply of fresh water is automatically provided to tank 12. Water is pumped from tank 12 by means of pump 22 through filter 43, flow regulator valve 25 and vertical feed line 26 to horizontal feed line 28. Regulator valve 25 is set to regulate the flow of water through the feed line. This flow is preferably set so that a small amount of water is observed to flow through clear plastic tube section 41, thus providing a constant head of water in feed line 28. The water pumped to horizontal feed line 28 is fed by gravity feed to each of reservoir feed lines 30. To prevent siphon action, vents 32 and 33 are provided at the ends of horizontal feed line 28. As to be explained in connection with FIG. 2, nipples 35 which connect horizontal feed line to reservoir feed lines 30 also have apertures therein to prevent such siphoning action.

Water is fed to each of reservoirs 38 through reservoir feed lines 30 by gravity feed, and then returned to tank 12 through return line 40. Return feed line 40 is connected to the bottom-most reservoirs 38 through connecting nipples 42. The return water is filtered to remove dirt therefrom by means of filter unit 45. Line 47 provides a water return to line 40.

Each of reservoir units 38 is contained in a separate animal pen 49 wherein an animal 50 can draw water at demand by licking the end of capillary tube 62 protruding out from each reservoir unit. Drain cock 55 is provided at one end of horizontal feed line 28 to enable draining of the lines if this should become necessary, as for example in cleaning. The various lines 26, 28, 40, 47 and 30 may be fabricated of plastic or any other suitable material. The device of the invention thus provides continuous circulation of fresh water to reservoir units in each of animal pens 49 where it is available to the animals on demand.

Referring now to FIGS. 2–5, the reservoir unit of the preferred embodiment of the device of the invention along with means for connecting such unit to the feed and return lines are illustrated. Water is fed from overhead supply line 28 by gravity feed through nipple 35 to reservoir feed line 30. Nipple 35 has an aperture 61 therein which acts as a vent hole to prevent siphoning action which might unduly increase the flow rate of the water.

Reservoir assembly 38 includes receptacle 69 which has a cover 72 on the top thereof, through which feed line 30 passes into the receptacle. Receptacle 69 fills with water up to the level established by standpipe member 67. The water thus rises to the top edge of standpipe 67 and holds at this level. All additional water entering the reservoir passes through standpipe 67 and output nipple 70 to line 30. Water is coupled from the bottom of each reservoir either to a subsequent reservoir or in the case of the last reservoir unit to nipple 42, which in turn is coupled to return line 40.

Right angle feeder tube 62 extends out from receptacle 69 through grommet 63 by means of which it is retained on the wall of the receptacle. Feeder tube 62 has a rather thick wall and a relatively narrow channel 66. Feeder tube 62 is positioned between standpipe 67 and block 65 formed in the inside wall of reservoir 38 in relatively close proximity to these two members. The walls of standpipe 67 and block 65 thus prevent feeder tube 62 from being pushed up or down appreciably by the animal. The bottom portion 73 of outlet nipple 70 has an inwardly tapering inside diameter. This tends to prevent vortex action which might pull bubbles into the flow and make it difficult for the animal to draw water. A vent hole 68 is provided in the wall of the reservoir to prevent a pressure or vacuum condition from arising which might tend to force water out of feeding tube 62 or conversely in the case of a vacuum situation to draw the water therefrom. Grooves 77 are formed in the wall of the reservoir container to conveniently receive a clip member (not shown) for attaching the reservoir to the wall of the animal pen. Three grooves are provided to allow vertical adjustment of the reservoir.

Reservoir unit 38 operates as follows: Water is circulated constantly through the container of the reservoir and maintained at the level of the top of standpipe member 67. Water rises above this level in tube 62 through the small channel 66 of the tube by virtue of capillary action and runs to the extreme end 79 of the tube where it adheres to the tube by virtue of surface tension. Thus, there is always water retained at the very end of feeder tube 62. When the animal licks the end of the tube drawing the liquid off, it is immediately replaced by virtue of the continuing capillary action. Thus, the animal can take the liquid gradually and such liquid is constantly available at his demand. At the same time, the liquid will not drop down into the pen in view of the molecular attraction between the end of the tube and the water, commonly known as surface tension. Fresh water is constantly available by virtue of the circulating system provided, such water being held to a desired level in the reservoir by the standpipe.

Referring now to FIG. 6, a second embodiment of the device of the invention is illustrated. Components of this embodiment which function similarly to those of the first embodiment are identified by the same numerals. The circulation system for this second embodiment may be the same as that just described for the first embodiment. Fresh water is fed into line 38 from reservoir feed line 30. Line 38 runs through each of pens 49 and forms a water reservoir for each of the pens. Mounted in the wall of each "reservoir" 38 by suitable watertight mounting means is a feeder tube 62 which is a capillary tube as described in connection with FIGS. 2–5. The water level is maintained below the horizontal arms of feeder tubes 62 by overflow line 67 which functions as a single "standpipe" for all of the feeder units in the row. Water is returned to the supply tank (not shown) through return line 47. The embodiment of FIG. 6, thus circulates the water to each of the pens where it is made available on demand through the capillary feed tubes, in the same general fashion as in the first embodiment. Vent 33 is utilized to maintain atmospheric pressure in the system.

The device of the invention thus provides a demand feeding system suitable for automatically providing liquid feeding to a great number of animals. The system is enclosed so there is little chance of contamination of the water supply and no dripping of water within the animal pens. Further, the water supply is constantly recirculated and filtered prior to such recirculation, so that fresh water is always provided. A constant fresh water supply is thereby available to the animals on demand at all times with a minimum amount of maintenance and attention to the system being required.

While the device of the invention has been described and illustrated in detail, it is to be clearly understood that this is intended by way of illustration and example only and is not to be taken by way of limitation, the spirit and scope of this invention being limited only by the terms of the following claims.

I claim,

1. In combination, a feeder reservoir and means for continually circulating water through said reservoir, said feeder reservoir comprising means for feeding water into said reservoir, means for feeding water out of said reservoir, standpipe means for establishing the water in said reservoir at a predetermined level, capillary feeder tube means for supplying water at a gradual rate from said reservoir, said feeder tube means including a thick-walled tube member having a narrow channel formed therein, said tube member having two leg portions angulated with respect to each other, and means for mounting said tube member on the wall of said reservoir with one leg portion thereof extending into said reservoir below said water level and the other leg portion thereof extending outside of said reservoir at a point above said water level, whereby water rises in said feeder tube by capillary action out to the end of the outwardly extending part thereof and is held at said end by surface tension, available to be drawn off on demand.

2. The combination as recited in claim 1 wherein said means for feeding water into and out of said reservoir comprises a gravity feed system.

3. The combination as recited in claim 1 wherein said reservoir comprises a horizontally oriented water line, said feeder tube means protruding through the wall of said water line in water tight relationship therewith, said standpipe means comprising an overflow line.

4. The combination as recited in claim 1 wherein said tube member leg portions are angulated at a substantially ninety degree angle.

5. The combination as recited in claim 1 wherein said reservoir has vent means formed therein for maintaining the inside of said reservoir at atmospheric pressure.

6. In combination, a feeder reservoir and means for continually circulating water through said reservoir, said feeder reservoir comprising,
   means for feeding water into said reservoir,
   means for feeding water out of said reservoir,
   standpipe means for establishing the water in said reservoir at a predetermined level,
   capillary feeder tube means for supplying water at a gradual rate from said reservoir, said feeder tube means including a thick-walled tube member having a narrow channel formed therein, said tube member being bent at a substantially 90° angle
   means for mounting said tube member on the wall of said reservoir with one leg portion thereof extending into said reservoir below said water level and the other leg portion thereof extending outside of said reservoir at a point above said water level, and
   means for preventing said feeder tube from being tilted upwardly or downwardly appreciably,
   whereby water rises in said feeder tube by capillary action out to the end of the outwardly extending part thereof and is held at said end by surface tension, available to be drawn off on demand.

7. The combination as recited in claim 6 wherein said means for preventing said feeder tube from being tilted includes a block protruding from the inside wall of said reservoir, said feeder tube being positioned between said standpipe and said block in close proximity thereto.

8. The combination as recited in claim 6 wherein said reservoir has vent hole means formed in the wall thereof for preventing a pressure or vacuum condition from developing in said reservoir.

9. A feeder reservoir device comprising
   means for feeding water into said reservoir,
   means for feeding water out of said reservoir,
   standpipe means for establishing the water in said reservoir at a predetermined level,
   capillary feeder tube means for supplying water from said reservoir by capillary action, said feeder tube means including a thick-walled tube member having a narrow channel formed therein, said tube member being bent to form two leg portions angulated with respect to each other,
   means for mounting said tube member on the wall of said reservoir with one leg portion thereof extending into said reservoir below said water level and the other leg portion thereof extending outside of said container at a point above said water level, and
   means for preventing said feeder tube from being tilted upward or downward appreciably,
   whereby water rises in said feeder tube by capillary action out to the end of the outwardly extending part thereof and is held at said end by surface tension, available to be drawn off on demand.

10. The device as recited in claim 9 wherein said reservoir has vent hole means formed therein for maintaining the inside of said reservoir at atmospheric pressure.

11. In an animal feed system for providing fresh water to a plurality of animal pens, a feeder reservoir located in each of said pens and means for continually circulating water through said reservoirs, said feeder reservoirs each including
    a covered enclosed container,
    separate standpipe means for establishing a predetermined water level in the associated container,
    a capillary feeder tube member having a narrow feed channel formed therein,
    means for mounting said feeder tube member in said container with one end thereof extending down into said container below said predetermined water level and the other end thereof protruding out from said container at a point above said predetermined water level, and
    vent means formed in said container for maintaining the inside of said container at atmospheric pressure,
    whereby water rises in said feed tube by capillary action out to the end of the protruding portion thereof and adheres to the end of said protruding portion by virtue of surface tension.

12. The system as recited in claim 11 wherein said means for circulating water through said reservoirs includes a water supply source, a feed line located at a gravity level above that of said reservoirs, means for conveying water from said supply source to said feed line, and means for conveying water from said feed line by gravity drop through said reservoirs back to said supply source.

13. The system as recited in claim 12 wherein said feed line has vent means formed therein to prevent siphoning action.

14. In an animal feed system for providing fresh water to a plurality of animal pens, a feeder reservoir located in each of said pens and means for continually circulating a water supply through said reservoirs, said feeder reservoirs each including
    a covered enclosed container,
    separate standpipe means for establishing a predetermined water level in the associated container,
    an angulated feeder tube member having a narrow feed channel formed therein, and
    means for mounting said feeder tube member in said container with one end thereof extending down into said container below said predetermined water level and the other end thereof protruding out from said container at a point above said predetermined water level,
    whereby water rises in said feed tube by capillary action out to the end of the protruding portion thereof and adheres to the end of said protruding portion by virtue of surface tension.

References Cited by the Examiner

UNITED STATES PATENTS

| | | | |
|---|---|---|---|
| 2,224,211 | 12/1940 | Austin | 119—18 |
| 2,303,615 | 12/1942 | Cobb et al. | 119—17 |
| 2,706,966 | 4/1955 | Cline | 119—74 |

FOREIGN PATENTS 891,679   3/1962   Great Britain.

SAMUEL KOREN, *Primary Examiner.*

HUGH R. CHAMBLEE, *Examiner.*